UNITED STATES PATENT OFFICE.

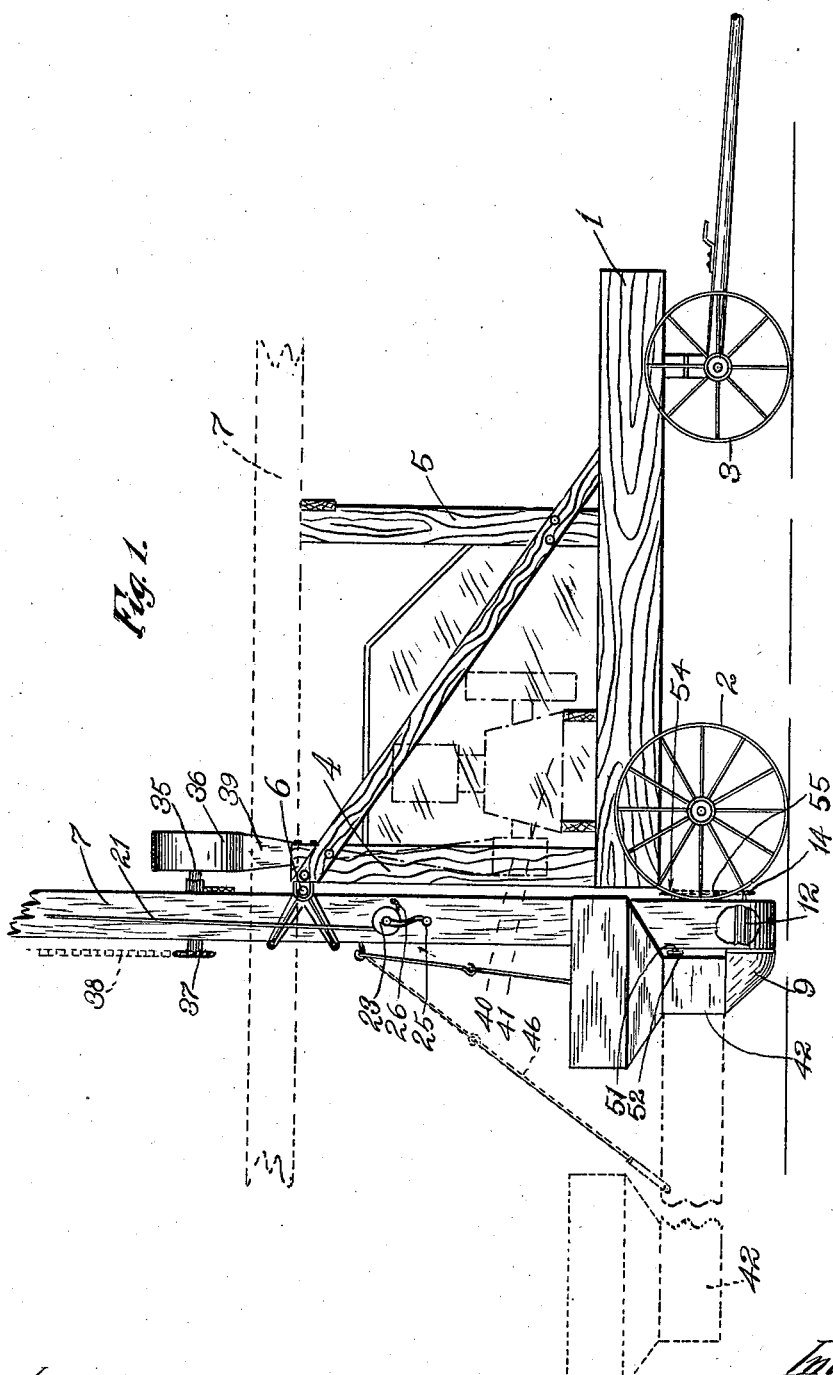

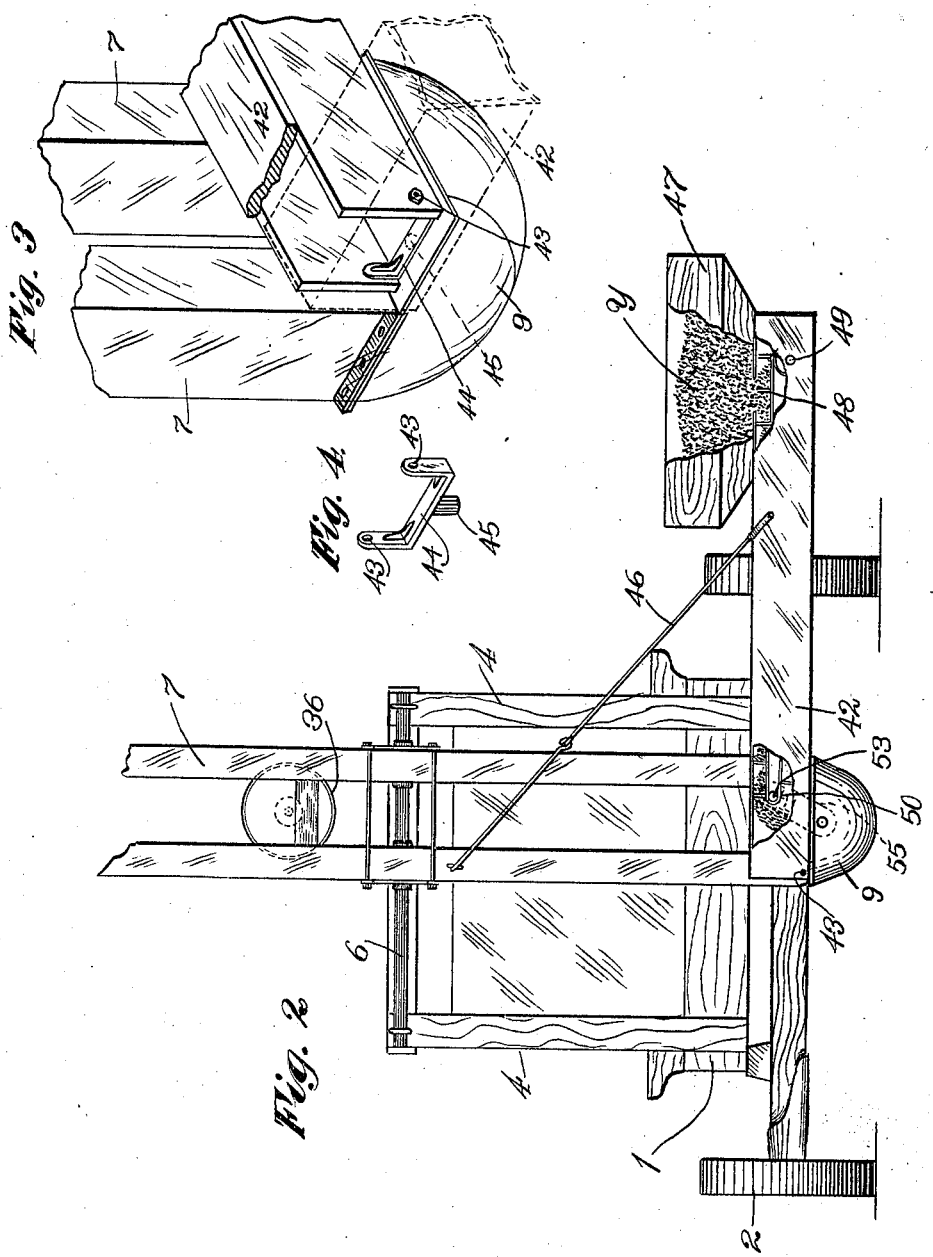

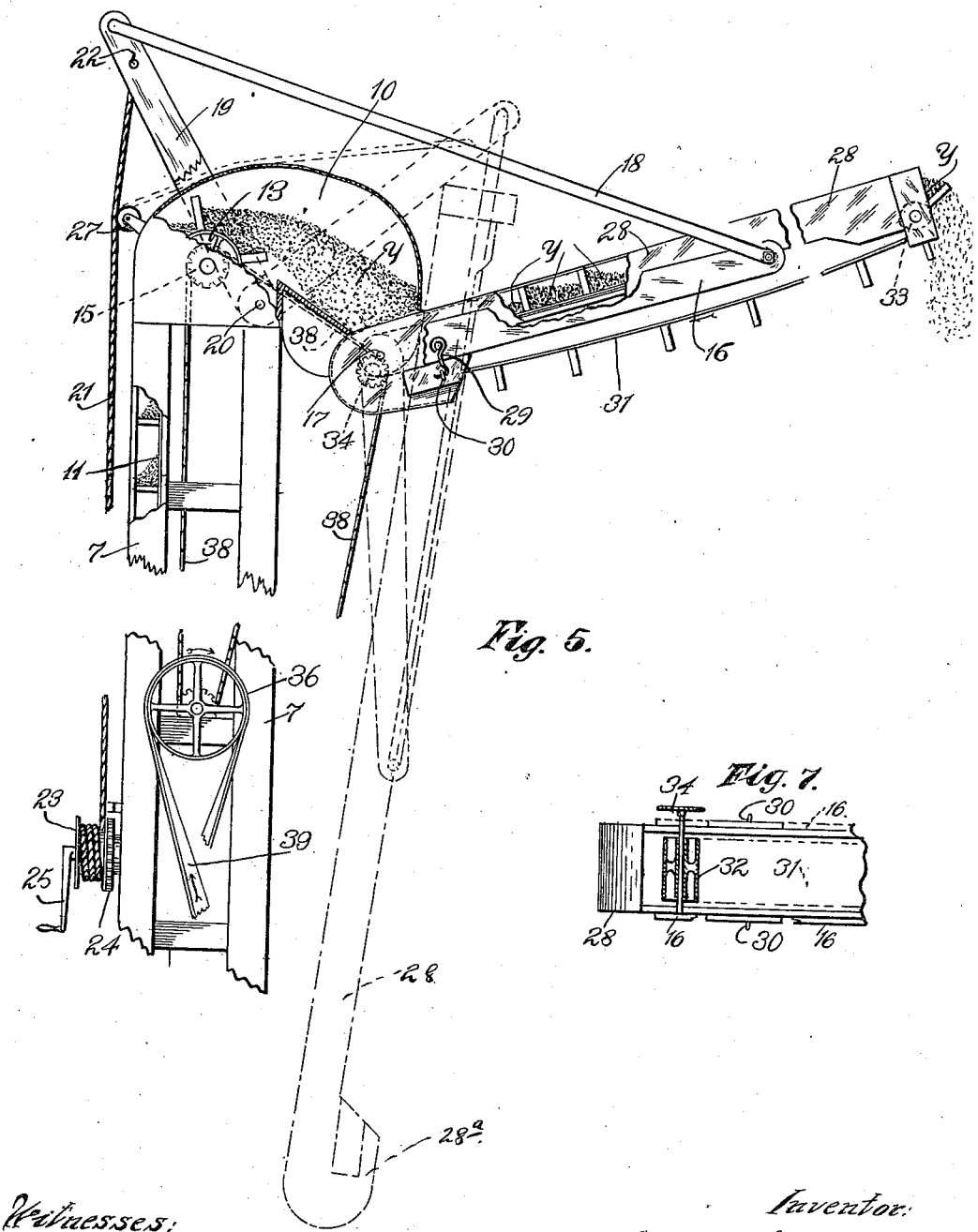

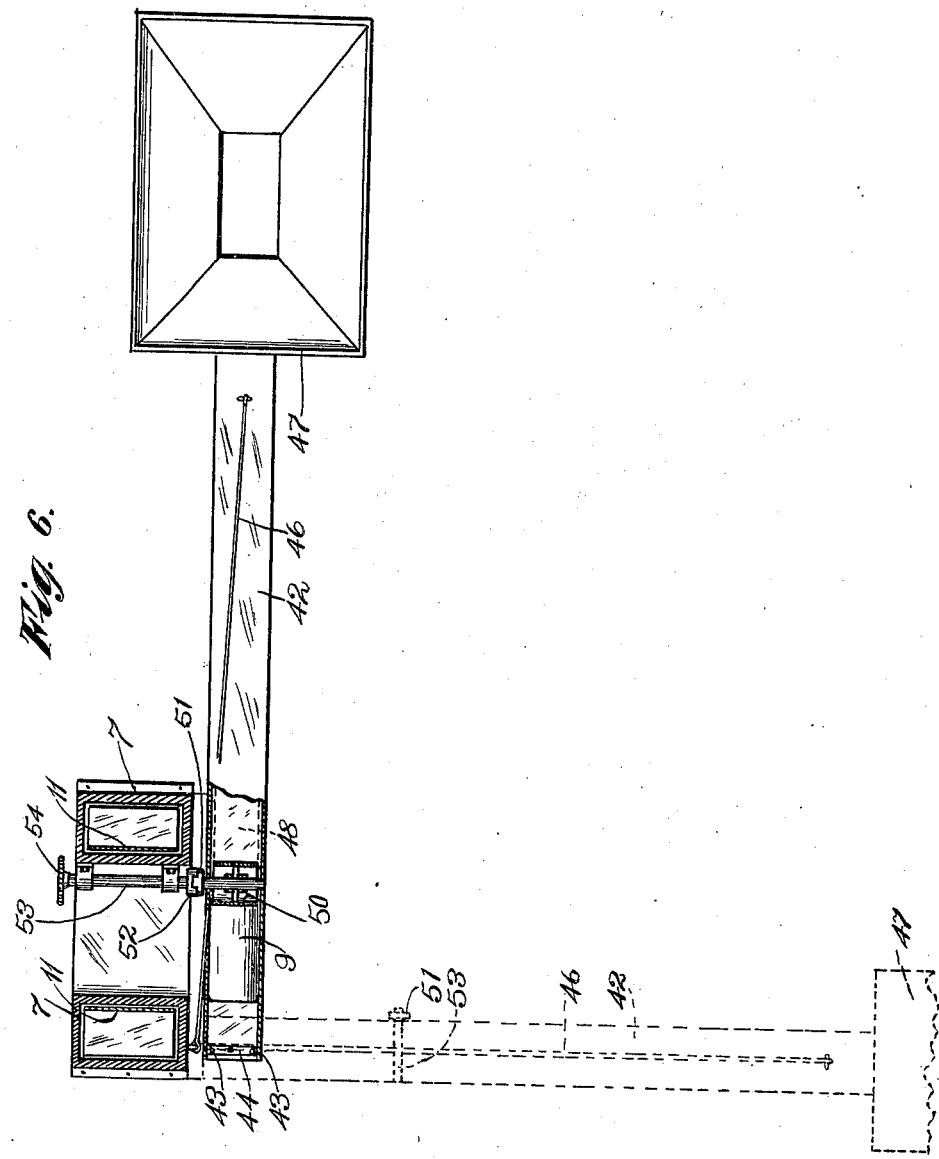

JOHN F. VALLENTYNE, OF MINNEAPOLIS, MINNESOTA.

PORTABLE GRAIN-ELEVATOR.

1,002,014. Specification of Letters Patent. Patented Aug. 29, 1911.

Application filed January 30, 1909. Serial No. 475,175.

*To all whom it may concern:*

Be it known that I, JOHN F. VALLENTYNE, a citizen of the United States, residing at Minneapolis, in the county of Hennepin and State of Minnesota, have invented certain new and useful Improvements in Portable Grain-Elevators; and I do hereby declare the following to be a full, clear, and exact description of the invention, such as will enable others skilled in the art to which it appertains to make and use the same.

My invention relates to portable elevators adapted to rapidly and economically handle grain and various other material, and has for its object to improve the same in the several particulars hereinafter named.

The invention consists of the novel devices and combinations of devices hereinafter described and defined in the claims.

In the accompanying drawings, which illustrate the invention, like characters designate like parts throughout the several views.

Referring to the drawings, Figure 1 is a view in side elevation, showing the improved elevator, some parts thereof being broken away; Fig. 2 is a rear elevation of the parts shown in Fig. 1, some parts being broken away; Fig. 3 is a fragmentary view in perspective, showing portions of the elevator trunk and of the grain supply spout; Fig. 4 is a detail in perspective showing the device pivotally connecting the two members shown in Fig. 3; Fig. 5 is a fragmentary view in front elevation, with parts broken away, showing the upper or delivery portions of the elevating mechanism; Fig. 6 is a view partly in plan and partly in diagram, showing the manner in which the grain supply spout is pivotally mounted for horizontal swinging movements; and Fig. 7 is a detail view in plan with some parts broken away, showing the inner end portion of the delivery spout and connections.

A suitable truck frame 1 mounted on rear wheels 2 and front wheels 3 serves directly or indirectly to support the various parts of the elevating mechanism. To the rear portion of the truck frame 1 upright supporting brackets or pedestals 4 are rigidly secured; and on the intermediate portion of said frame is an upright transversely extended rest bracket 5. By means of a transversely extended pivot shaft 6, a long bifurcated elevator leg 7 is pivotally connected for movements from a vertical operative position into a horizontal inoperative position. This pivot shaft 6 is at one side of the elevator leg 7, so that the said elevator leg will be held by gravity in an upright position, as shown by full lines in Fig. 1; and, furthermore, the longest portion of said leg is above said pivot, so that the said leg when turned horizontally over the truck, as shown by dotted lines, in Fig. 1, will be held by gravity upon the rest bracket 5. At its lower end portion, the elevator leg 7 is provided with a rearwardly projecting hopper or receiving bowl 9 that opens into the said leg; and at its upper end portion, it is provided with a hood 10 that opens from said leg and, as shown, projects toward the left hand side of the truck, as best shown in Fig. 5.

Working within the elevator leg 7 is an endless slat and belt conveyer 11 that runs over guide wheels or rollers 12 and 13 mounted, respectively, in the lower and upper end portions of said leg 7. The shaft of the lower roller 12 projects at one end, and is provided with a sprocket 14, while the shaft of the roller 13 projects at one end and is provided with a sprocket 15.

A pair of laterally spaced levers 16 are pivotally connected at their inner ends at 17 to the sides of the lower end portions of the hood 10, and the free ends of these levers 16 are connected by links 18 to the upper ends of another pair of laterally spaced levers 19, the lower ends of which are pivotally connected to the intermediate side portions of the hood 10 at 20. A cable 21 is attached at its upper end to a tie bar 22, that connects the upper end portions of the two levers 19. The lower end of this cable is connected to and adapted to be wound upon a windlass drum 23, shown as pivotally connected to one side of the elevator leg 7 and provided with a ratchet wheel 24 and an operating crank 25. A lock dog 26 on the elevator leg 7 coöperates with the ratchet wheel 24 to hold the cable 21 wound upon the drum 23, and hence, serves to hold the lever 16 in the raised position shown by full lines in Fig. 5. On the upper portion of the elevator leg 7 is a guide sheave 27, see Fig. 5, which guides the upper portion of the cable 21.

A grain delivery spout or casing 28 is pivotally connected at its intermediate portion to the free end portions of the levers 16, and works between the said levers. The outer end portion of this spout 28 is slightly heavier than the inner end portion, so that when the levers 16 are raised, it will of itself, turn into the projecting position with its inner end supply passage in registration with the discharge passage of the hood 10, as shown by full lines in Fig. 5. To secure said spout 28 to the levers 16 hooks 29 are shown as pivoted to said levers, and are engageable with eyes 30 on the inner end portion of the said spout.

An endless slat and belt conveyer 31 works within the spout 28, the said spout, as shown, being formed with a single leg which at its inner extremity, returns slightly upon itself as shown at 28ª. This conveyer 31 runs over guide rollers 32 and 33 mounted respectively, in the inner and outer end portions of the spout 28. The shaft of the roller 32 projects at one end, and is provided with a sprocket 34. Mounted in bearings on the intermediate portion of the elevator leg 7, is a short shaft 35 provided at one end with a pulley 36, and at its other end, with a sprocket 37. A sprocket chain 38 runs over the sprocket 37 and over the two sprockets 15 and 34 before described. Motion may be imparted to the shaft 35 by any suitable means, but as shown, this is done through a belt 39 that runs over the pulley 36 and over a pulley 40 of the driving shaft and explosive engine 41, which, as indicated by dotted lines in Fig. 1, is shown as mounted on the truck frame 1.

For delivering the grain from the wagon into the receiving hopper or bowl 9 of the elevator leg 7, I provide a horizontally extended conveyer spout or trough 42, which at its inner end, is arranged to deliver into the hopper or bowl 9 when the said spout is turned into a position at approximately a right angle to the longitudinal direction of the truck frame 1, as shown by full lines in Figs. 1, 2, 3 and 6. At its inner end, the said receiving spout 42 is pivotally connected at 43 to the prongs of a forked bearing 44, which latter has a depending centrally located trunnion 45, by means of which it is intermediately pivoted for horizontal swinging movements to the inner side portion of the elevator receiving hopper 9. This forked coupler mounts the spout 42 so that it may be swung rearward into an inoperative position, as shown by dotted lines in Figs. 1 and 6, and it also permits the said spout to be raised by vertical pivotal movements, either of which movements will carry the same out of the way of a wagon driven at one side of the machine. A hanger connection preferably in the form of a jointed rod 46, connects the intermediate portion of the receiving spout 42 to one branch or side of the elevator leg 7, as shown in Figs. 1, 2 and 6. By reference to Fig. 6, it will be noted, that the hanger rod 46 is attached to the elevator leg 7 at a point inward of the trunnion 45, so that when the said spout is turned into its operative position shown by full lines in Fig. 6, the slight lateral strain or pulling action of the said hanger rod on the spout will serve to hold the latter in its operative position. When, however, the spout is turned rearward into its inoperative position, as shown by dotted lines in Fig. 6, the hanger rod 46 will be moved on a dead center in respect to the trunnion 45 and there will then, be no tendency for the said spout 42 to swing in either direction. At its outer end, the spout 42 is provided with a receiving hopper 47 adapted to receive the grain Y, as indicated in Fig. 2.

Working within the spout 42, is an endless slat and belt conveyer 48 that runs over rollers 49 and 50, mounted respectively in the outer and inner end portions of the receiving spout 42. The shaft of the roller 50 projects at one end and is provided with a half clutch 51 that is adapted to engage with a half clutch 52 carried by a short shaft 53 mounted in suitable bearings on the elevator leg 7, and provided at its front end with a sprocket 54. A sprocket chain 55 indicated in Figs. 1 and 2, runs over the sprocket 54 and over the sprocket 14 of the lower elevator roller 12, and hence, drives the shaft 53 from the conveyer belt 11 of the elevator leg 7. It is here important to note, that the above noted lateral strain put upon the receiving spout 42 by the oblique hanger rod or connection 46, serves to hold the clutch members 51 and 52 engaged when the said spout 42 is in its operative position, indicated by full lines in Figs. 1, 2 and 6, so that the conveyer belt 48 of the receiving spout 42 will then be driven from the conveyer belt of the elevator leg. As soon, however, as the spout 42 is moved pivotally from its operative position, the clutch members 51 and 52 are disengaged, so that the conveyer belt 48 will be stopped. Furthermore, such pivotal movement of the spout 42 moves the same into a position in which it will not deliver into the hopper 9 of the elevator leg. From what has above been said, it is evident, that the receiving spout 42 is yieldingly held in its operative position and the clutch members 51 and 52 are held engaged by gravity, that is, by the weight of the spout 42 and parts carried thereby, acting through the oblique hanger connection 46.

Directing attention now to Fig. 5, it will be noted that the delivery spout 28, when released from the inner ends of the levers 16, may be dropped into an approximately vertical position close to the elevator leg 7, by outward rocking movements of the levers 16 and 19, such movements being controlled by the cable 21, and such positions being indicated by dotted lines. When the parts are thus dropped or moved, the spout 28 will be brought inside of the truck wheels 2 and 3, so that the entire rig may be passed through any kind of a gateway or passage through which the truck itself may be passed. When the elevator leg 7 is turned into its horizontal position indicated by dotted lines in Fig. 1, the folded spout 28 will, of course, be moved with the same, and will be dropped upon the pedestal 4 and rest bracket 5.

When by the cable 21, the levers 16 and 19 are moved from the positions indicated by dotted lines into the positions indicated by full lines in Fig. 5, the delivery spout 28 will, of course, be raised bodily, and as its upper end portion is heavier than its lower end portion, and is located outward of the pivotal connection between said spout and the arms 16, the said spout 28 in moving upward, will move outward or toward a horizontal position, and its delivery end will be rapidly extended away from the elevator leg 7 and hood 10. This movement adapts the delivery end of the spout 28 to be projected endwise through an elevated opening, such as a window or door, or over the top of a bin, and for this reason, is highly important. The said spout 28 is, of course, withdrawn from its operative position by a reverse endwise and inward rocking movement. The elevator leg 7, may, however, be raised and lowered by a simple swinging movement of the pivotal connections 17, and when such movement is desired, said spout 28 is left locked to the levers 16 by the hooks 29.

The parts 28 and 42 have been designated as spouts, and they are preferably inclosed spouts, but so far as the broad idea of my invention is concerned, they might be frames of any form suitable for supporting the conveyers mounted thereon and for coöperation therewith to convey grain or other material.

What I claim is:

1. In a machine of the kind described, the combination with an elevator leg and a conveyer working therein, of a lever pivotally mounted at the upper end portion of said leg, a connection for oscillating said lever, a delivery spout pivotally connected to said lever at a point distant from the lever supporting pivot, and means for locking said spout to said lever for common pivotal movements therewith, and for releasing said spout so that it may move pivotally in respect to said lever, substantially as described.

2. In a machine of the kind described, the combination with an elevator leg and a conveyer working therein, of two pairs of laterally spaced levers mounted at the upper end portion of said leg, links connecting corresponding members of said levers, a connection for oscillating said members, a delivery spout pivotally connected to one of said pairs of levers at points distant from the pivotal supports of said levers, and means for locking said spout to the said pair of levers to which it is pivotally connected for common pivotal movements therewith and for releasing the same at will, substantially as described.

3. In a machine of the kind described, the combination with an elevator leg and a conveyer working therein, of two pairs of levers pivotally supported at the upper end of said elevator leg, links connecting the corresponding members of said levers, a windlass connection applied to said elevator leg, and connected to the inner pair of levers, a conveyer spout intermediately pivoted to the outer end of the outer levers, means for detachably connecting the inner end of said spout to the inner end portions of said outer levers, and a conveyer working in said spout.

4. In a machine of the kind described, the combination with an elevator leg and a conveyer working therein, said leg having a receiving hopper at its lower portion, of an approximately horizontal receiving spout pivotally supported at its inner end at one side of said receiving hopper, and arranged to deliver into said hopper when turned into one extreme position, a conveyer in said receiving spout, a hopper at the free end of said spout, a drive for said conveyer including separable clutch members, and an oblique hanger rod attached at its upper end to one side of said elevator leg, and at its lower end to said spout, and adapted to yieldingly hold the said receiving spout in an operative position with said clutch members engaged.

In testimony whereof I affix my signature in presence of two witnesses.

JOHN F. VALLENTYNE.

Witnesses:
HARRY D. KILGORE,
ALICE V. SWANSON.